United States Patent
Hayashi et al.

(10) Patent No.: US 12,099,314 B2
(45) Date of Patent: Sep. 24, 2024

(54) IMAGE FORMING APPARATUS MEMBER, TRANSFER DEVICE, AND IMAGE FORMING APPARATUS

(71) Applicant: FUJIFILM Business Innovation Corp., Tokyo (JP)

(72) Inventors: Shogo Hayashi, Kanagawa (JP); Hiroaki Tanaka, Kanagawa (JP); Satoya Sugiura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/181,068

(22) Filed: Mar. 9, 2023

(65) Prior Publication Data

US 2024/0027933 A1 Jan. 25, 2024

(30) Foreign Application Priority Data

Jul. 20, 2022 (JP) ................. 2022-115913

(51) Int. Cl.
*G03G 15/16* (2006.01)
*C08G 77/04* (2006.01)
*G03G 15/08* (2006.01)
*G03G 15/30* (2006.01)

(52) U.S. Cl.
CPC ....... *G03G 15/0806* (2013.01); *C08G 77/045* (2013.01); *G03G 15/1605* (2013.01); *G03G 15/305* (2013.01); *G03G 2215/0187* (2013.01); *G03G 2215/1614* (2013.01); *G03G 2215/1623* (2013.01)

(58) Field of Classification Search
CPC .......... G03G 15/0806; G03G 15/1605; G03G 15/162; G03G 15/305; G03G 2215/0187; G03G 2215/1614; G03G 2215/1623; C08G 77/045
See application file for complete search history.

(56) References Cited

U.S. PATENT DOCUMENTS

2014/0354746 A1*  12/2014  Dooley ................ C09D 183/14
                                                                528/30
2022/0146966 A1*  5/2022   Ono ...................... G03G 15/162

FOREIGN PATENT DOCUMENTS

| EP | 2000862 A1 * | 12/2008 | ........... G03G 15/162 |
|---|---|---|---|
| JP | 2006-003882 A | 1/2006 | |
| JP | 2006-053319 A | 2/2006 | |
| JP | 4533038 B2 | 8/2010 | |
| JP | 5161417 B2 | 3/2013 | |
| WO | WO-2022081241 A1 * | 4/2022 | |

* cited by examiner

*Primary Examiner* — Sophia S Chen
(74) *Attorney, Agent, or Firm* — Sughrue Mion, PLLC (57) ABSTRACT

An image forming apparatus member includes a surface layer containing a Si-atom containing polymer as a major component. The dispersive component of the surface free energy of the surface layer is 25 mN/m or less, the dipole component of the surface free energy of the surface layer is 5 mN/m or less, and the hydrogen bonding component of the surface free energy of the surface layer is 5 mN/m or less.

20 Claims, 4 Drawing Sheets

IMAGE FORMING APPARATUS MEMBER, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-115913 filed Jul. 20, 2022.

BACKGROUND

(i) Technical Field

The present disclosure relates to image forming apparatus members, transfer devices, and image forming apparatuses.

(ii) Related Art

Japanese Unexamined Patent Application Publication No. 2006-53319 discloses a transfer transport belt that transports an electrostatically attracted recording medium to the image transfer positions of a plurality of image forming sections, that contains at least a thermoplastic resin and a conductive filler, and that satisfies the following relationships:

$$15 \leq \varepsilon b \leq 50$$

$$0.02 \leq \gamma b \leq 30$$

$$5 \leq (\varepsilon b)^{1/2} + (\gamma b)^{1/2} \leq 10$$

where $\varepsilon b$ is the relative dielectric constant of the transfer transport belt, and $\gamma b$ [mN/m] is the hydrogen bonding component of the surface energy of a surface of the transfer transport belt.

Japanese Unexamined Patent Application Publication No. 2006-3882 discloses an amount-of-developer regulating blade that has a predetermined peripheral edge shape, that is disposed so as to abut a developer carrier for transporting a developer carried on a surface thereof, and that is used to regulate the amount of developer carried on the surface of the developer carrier. The amount-of-developer regulating blade has a multilayer structure composed of a support member and a blade member bonded thereto, the blade member is formed of an elastomer containing a resin having a polar group, and when the surface free energy ($\gamma s$) of a surface of the blade member that abuts the developer carrier is expressed as the sum of a dispersive component ($\gamma sd$), a dipole component ($\gamma sp$), and a hydrogen bonding component ($\gamma sh$), the surface free energy ($\gamma s$) is 65 mN/m or less, the dipole component ($\gamma sp$) is 35 mN/m or less, and the hydrogen bonding component ($\gamma sh$) is 5 mN/m or less.

SUMMARY

Aspects of non-limiting embodiments of the present disclosure relate to an image forming apparatus member that exhibits better soiling resistance retaining properties than an image forming apparatus member that comprises a surface layer containing a Si-atom containing polymer as a major component and in which the dispersive component of the surface free energy of the surface layer is more than 25 mN/m, the dipole component of the surface free energy of the surface layer is more than 5 mN/m, or the hydrogen bonding component of the surface free energy of the surface layer is more than 5 mN/m.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus member comprising a surface layer containing a Si-atom containing polymer as a major component, wherein the dispersive component of the surface free energy of the surface layer is 25 mN/m or less, the dipole component of the surface free energy of the surface layer is 5 mN/m or less, and the hydrogen bonding component of the surface free energy of the surface layer is 5 mN/m or less.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described below by way of example.

In the present specification, when there are a plurality of materials that correspond to a component, the amount of that component refers to the total amount of the plurality of materials unless otherwise specified.

In the present specification, "conductive" refers to a volume resistivity of $10^{14}$ Ω·cm or less in a normal-temperature, normal-humidity environment (22° C./55% RH environment).

Image Forming Apparatus Member

An image forming apparatus member according to the present exemplary embodiment comprises a surface layer containing a Si-atom containing polymer as a major component. The dispersive component of the surface free energy of the surface layer is 25 mN/m or less, the dipole component of the surface free energy of the surface layer is 5 mN/m or less, and the hydrogen bonding component of the surface free energy of the surface layer is 5 mN/m or less.

The image forming apparatus member according to the present exemplary embodiment may be used as a belt member or a roller member.

The image forming apparatus member according to the present exemplary embodiment may have a single-layer configuration composed only of the surface layer or may further include, for example, a conductive substrate and an elastic layer.

In the related art, a urethane resin having a fluorocarbon resin dispersed therein is used for a surface layer. However, it has been found that a large amount of fluorocarbon resin needs to be added to achieve high soiling resistance, and this tends to result in cracks because of decreased bending durability. In view of bendability, a method for imparting soiling resistance to a base polymer may be employed.

The image forming apparatus member according to the present exemplary embodiment comprises a surface layer containing a Si-atom containing polymer as a major component. The dispersive component of the surface free energy of the surface layer is 25 mN/m or less, the dipole component of the surface free energy of the surface layer is 5 mN/m or less, and the hydrogen bonding component of the surface free energy of the surface layer is 5 mN/m or less. Thus, whereas the surface layer is formed of a fluorine-free material with high mechanical strength, not only is the dispersive component of the surface free energy of the surface layer small, but the hydrogen bonding component and the dipole component, which have a large contribution to intermolecular force, which has a particularly large influence on adhesion, are also small. Therefore, the influence of the charge polarity of the molecular structure may be small, and the adhesion of residue may be reduced, which may result in not only good soiling resistance, but also good soiling resistance retaining properties. In addition, since the surface layer contains a Si-atom containing polymer as a major component, the occurrence of cracks over time, which is one of the factors for soiling, may also be inhibited, which may result in good soiling resistance retaining properties.

In addition, the image forming apparatus member according to the present exemplary embodiment may exhibit good friction coefficient retaining properties and may thus exhibit good cleaning performance retaining properties.

The image forming apparatus member according to the present exemplary embodiment will be described with reference to the drawings.

Figure 1:
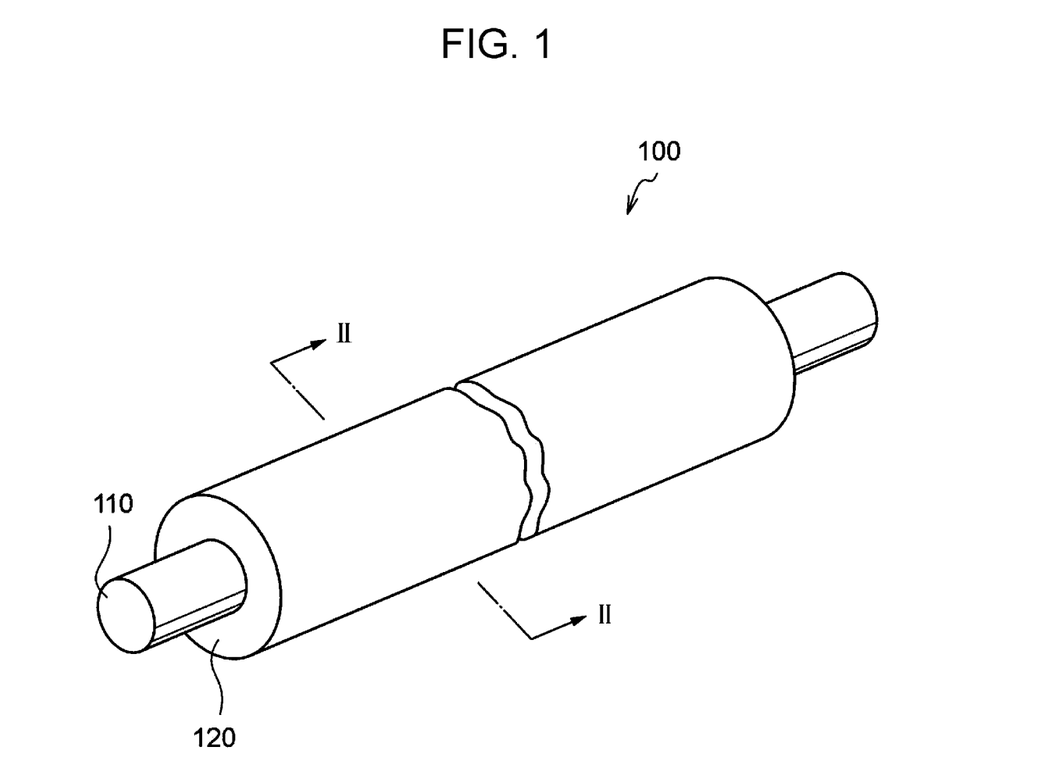
FIG. 1 is a schematic perspective view illustrating an example image forming apparatus member according to the present exemplary embodiment.

FIG. 1 is a schematic perspective view illustrating an example image forming apparatus member according to the present exemplary embodiment.

Figure 2:
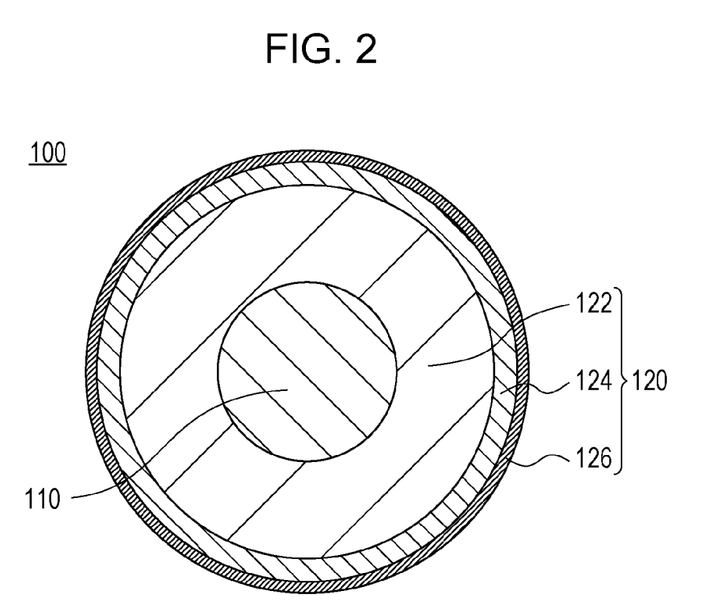
FIG. 2 is a schematic sectional view illustrating the example image forming apparatus member according to the present exemplary embodiment and is a sectional view taken along line II-II in FIG. 1.

FIG. 2 is a sectional view taken along line II-II in FIG. 1 and is a sectional view taken in the radial direction of the image forming apparatus member illustrated in FIG. 1.

As illustrated in FIG. 1, an image forming apparatus member 100 is a roller member including a cylindrical conductive substrate 110 and a layer stack 120 disposed on the outer peripheral surface of the conductive substrate 110 and including an elastic layer 122, an intermediate layer 124, and a surface layer 126. The image forming apparatus member according to the present exemplary embodiment may also be a belt member.

As illustrated in FIG. 2, the layer structure of the image forming apparatus member 100 includes the elastic layer 122 disposed on the outer peripheral surface of the cylindrical conductive substrate 110, the intermediate layer 124 disposed on the outer peripheral surface of the elastic layer 122, and the surface layer 126 disposed on the outer peripheral surface of the intermediate layer 124.

The image forming apparatus member according to the present exemplary embodiment is not limited to the configuration illustrated in FIGS. 1 and 2; for example, the image forming apparatus member according to the present exemplary embodiment may, as appropriate, include an adhesive layer between the conductive substrate 110 and the elastic layer 122, between the elastic layer 122 and the intermediate layer 124, and/or between the intermediate layer 124 and the surface layer 126.

The details of the image forming apparatus member 100 according to the present exemplary embodiment will be described below. Reference numerals are omitted in the following description.

Surface Layer

The surface layer is, for example, an outermost layer disposed over the outer peripheral surface of the conductive substrate.

The image forming apparatus member according to the present exemplary embodiment may include one or more surface layers.

If the image forming apparatus member includes a plurality of surface layers, the outermost surface layer disposed over the outer peripheral surface of the conductive substrate contains a Si-atom containing polymer as a major component, the dispersive component of the surface free energy of the surface layer is 25 mN/m or less, the dipole component of the surface free energy of the surface layer is 5 mN/m or less, and the hydrogen bonding component of the surface free energy of the surface layer is 5 mN/m or less.

The dispersive component of the surface free energy of the surface layer is 25 mN/m or less, preferably 0 mN/m or more and 25 mN/m or less, more preferably 5 mN/m or more and 24 mN/m or less, even more preferably 10 mN/m or more and 23 mN/m or less, from the viewpoint of soiling resistance retaining properties and cleaning performance.

The dipole component of the surface free energy of the surface layer is 5 mN/m or less, preferably 0 mN/m or more and 5 mN/m or less, more preferably 0 mN/m or more and 3 mN/m or less, even more preferably 0 mN/m or more and 2 mN/m or less, particularly preferably 0 mN/m or more and 1 mN/m or less, from the viewpoint of soiling resistance retaining properties.

The hydrogen bonding component of the surface free energy of the surface layer is 5 mN/m or less, preferably 0 mN/m or more and 5 mN/m or less, more preferably 0 mN/m or more and 3 mN/m or less, even more preferably 0 mN/m or more and 2 mN/m or less, particular preferably 0 mN/m or more and 1 mN/m or less, from the viewpoint of soiling resistance retaining properties.

The values of the dispersive component (dispersive term), dipole component (dipole term), and hydrogen bonding component (hydrogen bonding term) of the surface free energy of the surface layer in the present exemplary embodiment are determined using a CAM-200 contact angle meter (manufactured by KSV Instruments, Inc.) by its built-in program calculation using the Zisman method.

The surface layer contains a Si-atom containing polymer as a major component.

"Major component" in the present exemplary embodiment refers to a component present in an amount of 50% by mass or more.

From the viewpoint of soiling resistance retaining properties and cleaning performance, the amount of Si-atom containing polymer in the surface layer is preferably 50% by mass or more and 100% by mass or less, more preferably 80% by mass or more and 100% by mass or less, even more preferably 90% by mass or more and 100% by mass or less, particular preferably 95% by mass or more and 100% by mass or less, based on the total mass of the surface layer.

Although the main chain backbone of the Si-atom containing polymer is not particularly limited, the main chain backbone of the Si-atom containing polymer is preferably a backbone having a cyclic structure, more preferably a backbone having a cyclic hydrocarbon structure, particular preferably a polynorbornene backbone, from the viewpoint of soiling resistance retaining properties.

"Main chain" in a polymer refers to the longest polymer chain in the polymer.

From the viewpoint of soiling resistance retaining properties and to reduce the individual components of the surface free energy, the Si-atom containing polymer preferably has a trialkylsiloxy group, more preferably a tris(trialkylsiloxy)silyl group.

Examples of alkyl groups in the trialkylsiloxy group (including the trialkylsiloxy groups in the tris(trialkylsiloxy)silyl group; the same applies hereinafter) include linear or branched alkyl groups having 1 or more and 6 or less carbon atoms (e.g., methyl, ethyl, n-propyl, isopropyl, n-butyl, isobutyl, n-pentyl, and n-hexyl groups).

Of these, from the viewpoint of soiling resistance retaining properties and to reduce the individual components of the surface free energy, the alkyl groups in the trialkylsiloxy group are preferably alkyl groups having 1 or more and 6 or less carbon atoms, more preferably alkyl groups having 1 or more and 4 or less carbon atoms, even more preferably alkyl groups having 1 or more and 3 or less carbon atoms, particularly preferably methyl groups; that is, the trialkylsiloxy group is preferably a trimethylsiloxy group.

From the viewpoint of soiling resistance retaining properties and to reduce the individual components of the surface free energy, the Si-atom containing polymer preferably has a structural unit having a trialkylsiloxy group, more preferably a structural unit having a tris(trialkylsiloxy)silyl group.

From the viewpoint of soiling resistance retaining properties and to reduce the individual components of the surface free energy, the Si-atom containing polymer preferably has a structural unit having a trialkylsiloxy group on a cyclic structure, more preferably a structural unit having a tris(trialkylsiloxy)silyl group on a cyclic structure.

From the viewpoint of soiling resistance retaining properties and to reduce the individual components of the surface free energy, the Si-atom containing polymer is preferably a silicone-modified polynorbornene resin having a structural unit represented by the following structure (N1), more preferably a silicone-modified polynorbornene resin having a structural unit represented by the following structure (N1) and a structural unit represented by the following structure (N2):

(N1)

(N2)

where $R^1$, $R^2$, and $R^3$ in the structure (N1) each independently represent an alkyl group.

From the viewpoint of soiling resistance retaining properties and to reduce the individual components of the surface free energy, $R^1$, $R^2$, and $R^3$ in the structure (N1) of the Si-atom containing polymer preferably each independently represent an alkyl group having 1 or more and 6 or less carbon atoms, more preferably an alkyl group having 1 or more and 4 or less carbon atoms, even more preferably an alkyl group having 1 or more and 3 or less carbon atoms, particular preferably a methyl group.

From the viewpoint of soiling resistance retaining properties and to reduce the individual components of the surface free energy, the copolymerization ratio (N1/N2) by mole of the structural unit represented by the structure (N1) to the structural unit represented by the structure (N2) is preferably 20/80 or more and 98/2 or less, more preferably 30/70 or more and 95/5 or less, particular preferably 40/60 or more and 85/15 or less.

From the viewpoint of soiling resistance retaining properties, the proportion of Si atoms present in the surface of the surface layer as measured by X-ray photoelectron spectroscopy is preferably 5 atom % or more and 70 atom % or less, more preferably 10 atom % or more and 50 atom % or less, particular preferably 20 atom % or more and 45 atom % or less.

The proportion of Si atoms present in the surface of the surface layer in the present exemplary embodiment is determined by X-ray photoelectron spectroscopy (XPS) in the follow manner.

A specimen of the surface layer is analyzed by X-ray photoelectron spectroscopy (XPS) under the following conditions, and the silicon element concentration (atom %) is determined from the peak intensities of the individual elements.

XPS system: Versa Probe II, manufactured by ULVAC-PHI, Inc.
Etching gun: argon gun
Acceleration voltage: 5 kV
Emission current: 20 mA
Sputtered area: 2 mm×2 mm
Sputtering rate: 3 nm/min (on $SiO_2$ basis)

Although the method for forming the surface layer is not particularly limited, the surface layer can be formed, for example, by applying a composition for forming the surface layer containing the Si-atom containing polymer to the conductive substrate by a technique such as spray coating and then heating the coating.

The surface layer preferably has an average thickness of, for example, 10 nm or more and 200 μm or less, more preferably 10 nm or more and 100 μm or less, particular preferably 50 nm or more and 50 μm or less.

The surface layer may optionally contain other additives as long as they do not interfere with the advantages of the present exemplary embodiment. Examples of additives include those similar to other additives that may be used in the elastic layer, described later.

Conductive Substrate

The image forming apparatus member according to the present exemplary embodiment may include a conductive substrate.

Examples of conductive substrates that may be used include those formed of conductive materials, including metals and alloys such as aluminum, copper alloys, and stainless steel; iron plated with chromium, nickel, or the like; and conductive resins (e.g., resin substrates containing conductive materials and rubber substrates containing conductive materials).

The conductive substrate functions as an electrode and support member, and examples of materials that may be used therefor include metals such as iron (e.g., free-cutting steel), copper, brass, stainless steel, aluminum, and nickel. The conductive substrate may also be a member (e.g., a resin member or a ceramic member) having the outer peripheral surface thereof subjected to plating treatment or a member (e.g., a rubber member, a resin member, or a ceramic member) having a conductor dispersed therein. The conductive substrate may be a hollow member (tubular member) or a non-hollow member.

The outer diameter of the conductive substrate is not particularly limited, but may be selected as appropriate depending on the use, for example, in the range of 3 mm or more and 20 mm or less.

The length of the conductive substrate in the axial direction is not particularly limited, but may be selected as appropriate depending on the use, for example, in the range of 220 mm or more and 380 mm or less.

Elastic Layer

The image forming apparatus member according to the present exemplary embodiment may further include an elastic layer between the conductive substrate and the surface layer. The image forming apparatus member according to the present exemplary embodiment may include one or more elastic layers.

The elastic layer contains an elastic material.

Examples of elastic materials include rubber materials and resin materials.

Examples of rubber materials include isoprene rubber, chloroprene rubber, epichlorohydrin rubber, butyl rubber, silicone rubber, fluorocarbon rubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether terpolymer rubber, ethylene-propylene-diene terpolymer rubber (EPDM), acrylonitrile-butadiene copolymer rubber (NBR), polyurethane rubber, natural rubber, and mixtures thereof.

Examples of resin materials include polyurethane resins, polyimide resins (PI resins), polyamide-imide resins (PAI resins), aromatic polyetherketone resins (e.g., aromatic polyetheretherketone resins), polyphenylene sulfide resins (PPS resins), polyetherimide resins (PEI resins), polyester resins, polyamide resins, and polycarbonate resins.

The elastic layer may contain a conductor such as an electronic conductor or an ionic conductor from the viewpoint of conductivity control.

Examples of electronic conductors include powders of the following materials: carbon black such as ketjen black and acetylene black; pyrolytic carbon; graphite; metals and alloys such as aluminum, copper, nickel, and stainless steel; conductive metal oxides such as tin oxide, indium oxide, titanium oxide, tin oxide-antimony oxide solid solutions, and tin oxide-indium oxide solid solutions; and insulating materials having the surfaces thereof subjected to conductive treatment.

A single electronic conductor may be used alone, or two or more electronic conductors may be used in combination.

Examples of ionic conductors include quaternary ammonium salts (e.g., alkyltrimethylammonium perchlorates, and perchlorate salts, chlorate salts, fluoroborate salts, sulfate salts, ethosulfate salts, benzyl bromide salts, and benzyl chloride salts of lauryltrimethylammonium, stearyltrimethylammonium, octadodecyltrimethylammonium, dodecyltrimethylammonium, hexadecyltrimethylammonium, and modified fatty acid-dimethylethylammonium), aliphatic sulfonic acid salts, higher alcohol sulfate ester salts, higher alcohol ethylene oxide adduct sulfate ester salts, higher alcohol phosphate ester salts, higher alcohol ethylene oxide adduct phosphate ester salts, betaines, higher alcohol ethylene oxide adducts, polyethylene glycol fatty acid esters, and polyhydric alcohol fatty acid esters.

The ionic conductor may also be a polymer material with ionic conductivity, such as epichlorohydrin rubber, epichlorohydrin-ethylene oxide copolymer rubber, or epichlorohydrin-ethylene oxide-allyl glycidyl ether terpolymer rubber.

The ionic conductor may also be a compound having an ionic conductor attached to an end of a polymer material such as a resin.

A single ionic conductor may be used alone, or two or more ionic conductors may be used in combination.

Examples of other additives include known materials that can be added to elastomers, such as softeners, plasticizers, curing agents, vulcanizing agents, vulcanization accelerators, antioxidants, surfactants, coupling agents, and fillers (e.g., silica and calcium carbonate).

The elastic layer may be a foam containing an elastic material (hereinafter also referred to as "elastic foam"). To obtain an elastic foam, other additives such as blowing aids, foam stabilizers, and catalysts may optionally be used. Examples of blowing agents include water; azo compounds such as azodicarbonamide, azobisisobutyronitrile, and diazoaminobenzene; benzenesulfonyl hydrazides such as benzenesulfonyl hydrazide, 4,4'-oxybisbenzenesulfonyl hydrazide, and toluenesulfonyl hydrazide; bicarbonate salts such as sodium hydrogen carbonate, which generate carbon dioxide gas by thermal decomposition; mixtures of $NaNO_2$ and $NH_4Cl$, which generate nitrogen gas; and peroxides, which generate oxygen.

Formation of Elastic Layer

The method for forming the elastic layer is not particularly limited, and known methods may be used.

For example, if the elastic layer is an elastic foam, examples of methods for forming the elastic foam include a method in which a composition containing an elastic material, a blowing agent, and other ingredients (e.g., a vulcanizing agent) is prepared, the composition is extruded into a hollow cylindrical shape, and the extruded composition is vulcanized and foamed by heating; and a method in which a large foam is cut into a hollow cylindrical shape. A hollow cylindrical elastic foam may also be obtained by forming a solid cylindrical elastic foam and then forming a central hole for insertion of a support member. After a hollow cylindrical elastic foam is obtained, further shaping and post-processing such as surface polishing may optionally be performed.

Volume Resistance Value of Elastic Layer

The elastic layer preferably has a volume resistance value of $10^9\Omega$ or less, more preferably $10^1\Omega$ or more and $10^9\Omega$ or less, even more preferably $10^2\Omega$ or more and $10^8\Omega$ or less, at an applied voltage of 10 V.

The volume resistance value of the elastic layer is measured as follows.

The image forming apparatus member is placed on a metal plate such as a copper plate, with a load of 500 g applied to each end of the image forming apparatus member, a voltage (V) of 10 V (in the case of the elastic layer) is applied between the conductive support member of the image forming apparatus member and the metal plate with a microammeter (R8320 manufactured by Advantest Corporation), the current I (A) is read after five seconds, and the volume resistance value is determined by calculation using the following equation. The measurement is performed in an environment at a temperature of 22° C. and a humidity of 55% RH.

volume resistance value $Rv$ (Ω)=$V/I$         Equation:

Thickness of Elastic Layer

The thickness of the elastic layer is not particularly limited, but may be selected as appropriate depending on the use. For example, if the image forming apparatus member according to the present exemplary embodiment is used as a transfer member, the elastic layer preferably has a thickness of 2 mm or more and 20 mm or less, more preferably 2 mm or more and 15 mm or less.

The outer diameter of the elastic layer is not particularly limited, but may be selected as appropriate depending on the use, for example, in the range of 6 mm or more and 30 mm or less.

The length of the elastic layer in the axial direction is not particularly limited, but may be selected as appropriate depending on the use, for example, in the range of 220 mm or more and 380 mm or less.

Conductive Covering Layer

The elastic layer may include a conductive covering layer covering the exposed surface of the elastic layer.

The exposed surface of the elastic layer refers to a region of the elastic layer that is not in contact with the conductive substrate or other layers and that is exposed as the image forming apparatus member is viewed in its entirety.

The exposed surface of the elastic layer may be partially or completely covered by the conductive covering layer.

Although the method for forming the conductive covering layer is not particularly limited, the conductive covering layer may be formed, for example, by applying a treatment liquid containing, for example, a conductor, a resin, and water to the elastic foam and then drying the image forming apparatus member having the treatment liquid deposited thereon by heating.

Examples of methods for applying the treatment liquid include a method in which the treatment liquid is applied to the elastic foam by a technique such as spray coating and a method in which the elastic foam is immersed in the treatment liquid. These methods allow the treatment liquid to permeate through the surface of the elastic layer into the cells.

The conductor may be, for example, an electronic conductor or an ionic conductor, preferably an electronic conductor. One or more conductors may be used.

Examples of electronic conductors include those similar to electronic conductors that may be present in the elastic layer as described above.

The resin is not particularly limited as long as the resin can form a covering layer on the exposed surface of the elastic layer, and examples of resins include acrylic resins, urethane resins, fluorocarbon resins, and silicone resins. One or more resins may be used.

The resin may also be used as a latex.

Examples of latexes include latexes of the resins mentioned above, natural rubber latex, butadiene rubber latex, acrylonitrile-butadiene rubber latex, acrylic rubber latex, polyurethane rubber latex, fluorocarbon rubber latex, and silicone rubber latex.

The concentrations of the conductor and the resin in the treatment liquid may be determined as appropriate depending on, for example, suitability for formation of the conductive covering layer and the resistance value of the elastic layer to be formed.

Intermediate Layer

The image forming apparatus member according to the present exemplary embodiment may further include an intermediate layer between the conductive substrate and the surface layer.

The intermediate layer may contain a conductor, for example, from the viewpoint of resistance control of the image forming apparatus member.

Although the conductor used may be an electronic conductor or an ionic conductor, an ionic conductor may be used from the viewpoint of improved charge retaining properties. Examples of ionic conductors include those similar to ionic conductors that may be present in the elastic foam. A single ionic conductor may be used alone, or two or more ionic conductors may be used in combination.

In addition to the ionic conductor, the intermediate layer may contain a binder material.

The binder material is not particularly limited, and examples of binder materials include resins and elastic materials that can form the intermediate layer. Examples of resins that may be used in the intermediate layer include urethane resins, acrylic resins, epoxy resins, and silicone resins. Examples of elastic materials that may be present in the intermediate layer include those similar to elastic materials that may be used in the elastic layer.

If the intermediate layer contains a binder material, the amount of ionic conductor is preferably 0.1 parts by mass or more and 5.0 parts by mass or less, more preferably 0.5 parts by mass or more and 3.0 parts by mass or less, based on 100 parts by mass of the binder material.

The intermediate layer may contain other additives depending on, for example, the physical properties of the intermediate layer to be formed.

The intermediate layer preferably has a volume resistance value of $10^4$Ω or more and $10^9$Ω or less (more preferably, $10^6$Ω or more and $10^9$Ω or less) at an applied voltage of 100 V.

The method for forming the intermediate layer is not particularly limited, and known methods can be used. Examples of methods for forming the intermediate layer include a method in which a coating liquid for forming the intermediate layer is applied to the elastic layer, and the coating is dried.

Although the thickness of the intermediate layer may be determined depending on the use of the image forming apparatus member, the intermediate layer may be, for example, thinner than the elastic layer. If the image forming apparatus member according to the present exemplary embodiment is a second transfer roller, the intermediate layer may have a thickness of, for example, 0.5 mm or more and 5 mm or less.

Next, a case where the image forming apparatus member according to the present exemplary embodiment is a second transfer roller or a second transfer belt (hereinafter also referred to as "second transfer member according to the present exemplary embodiment") will be described. Reference numerals are omitted in the following description.

The second transfer member according to the present exemplary embodiment includes a surface layer containing a Si-atom containing polymer as a major component. The dispersive component of the surface free energy of the surface layer is 25 mN/m or less, the dipole component of the surface free energy of the surface layer is 5 mN/m or less, and the hydrogen bonding component of the surface free energy of the surface layer is 5 mN/m or less.

The surface layer of the second transfer member according to the present exemplary embodiment may be similar to the surface layer described above except for the details described below.

The surface layer may contain a conductor. The surface layer may also contain other additives.

Examples of conductors include carbon black; metals such as aluminum and nickel; metal oxides such as yttrium oxide and tin oxide; ionically conductive materials such as potassium titanate and potassium chloride; and conductive polymers such as polyaniline, polypyrrole, polysulfone, and polyacetylene. Of these, carbon black may be used from the viewpoint of conductivity and cost.

Examples of carbon black include ketjen black, oil furnace black, channel black, acetylene black, and surface-oxidized carbon black (hereinafter referred to as "surface-treated carbon black"). Of these, surface-treated carbon black may be used from the viewpoint of electrical resistance stability over time.

Surface-treated carbon black can be obtained by adding, for example, carboxyl groups, quinone groups, lactone groups, or hydroxyl groups to the surface thereof.

For example, the amount of conductor added is preferably 10 parts by mass or more and 30 parts by mass or less, more preferably 13 parts by mass or more and 25 parts by mass or less, based on 100 parts by mass of the resin present in the surface layer.

Examples of other additives include known additives such as antioxidants, surfactants, heat-resistant antiaging agents, dispersants, various fillers, catalysts, colorants, and leveling agents.

The second transfer member according to the present exemplary embodiment may have a single-layer configuration composed of the surface layer or may have a multilayer configuration composed of two or more layers including the surface layer as the outermost layer.

If the second transfer member according to the present exemplary embodiment is a second transfer belt, the multilayer configuration composed of two or more layers may be a multilayer configuration including a substrate layer and a surface layer disposed on the substrate layer; if the second transfer member is a second transfer roller, the multilayer configuration composed of two or more layers may be a multilayer configuration including a substrate (e.g., a shaft), an elastic layer disposed on the substrate, and a surface layer disposed on the elastic layer. Known substrates can be used as the substrate for the second transfer roller, and conductive substrates as described above may also be used.

Next, the layers other than the surface layer of the second transfer member according to the present exemplary embodiment (i.e., the substrate layer and the elastic layer) will be described.

If the second transfer member according to the present exemplary embodiment is a second transfer belt, the substrate provided as the underlying layer for the surface layer is not particularly limited, and substrate layers used for known second transfer belts may be used.

Examples of substrate layers include resin layers containing conductors (e.g., layers of resins such as polyurethane resins, fluorinated polyurethane resins, polyimide resins, fluorinated polyimide resins, polyamide resins, polyamide-imide resins, polyetherimide resins, polyetheretherester resins, polyarylate resins, polyester resins, polyetheretherketone resins, polyethersulfone resins, polyphenylsulfone, polysulfone resins, polyethylene terephthalate resins, polybutylene terephthalate resins, polyacetal resins, and polycarbonate resins); and rubber layers containing conductors (e.g., layers of rubbers such as isoprene rubber, chloroprene rubber (CR), epichlorohydrin rubber (ECO), butyl rubber, polyurethane, silicone rubber, fluorocarbon rubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and mixtures of two or more thereof).

If the second transfer member according to the present exemplary embodiment is a second transfer roller, the elastic layer provided as the underlying layer for the surface layer is not particularly limited, and elastic layers used for known second transfer rollers may be used.

Examples of elastic layers include rubber layers containing conductors (e.g., layers of rubbers such as isoprene rubber, chloroprene rubber (CR), epichlorohydrin rubber (ECO), butyl rubber, polyurethane, silicone rubber, fluorocarbon rubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and mixtures of two or more thereof). The elastic layer may be a foamed layer or an unfoamed layer.

Use

The image forming apparatus member according to the present exemplary embodiment may be used as an electrophotographic image forming apparatus member (e.g., a charging member that charges a member to be charged, a transfer member that transfers a toner image to a recording medium or an intermediate transfer body, a second transfer member, a recording medium transport member, or an intermediate transfer body).

Image Forming Apparatus, Transfer Device, and Process Cartridge

An image forming apparatus according to the present exemplary embodiment comprises the image forming apparatus member according to the present exemplary embodiment and may comprise an image carrier, a charging device that charges a surface of the image carrier, an electrostatic latent image forming device that forms an electrostatic latent image on the charged surface of the image carrier, a developing device that develops the electrostatic latent image formed on the surface of the image carrier with a developer containing a toner to form a toner image, and a transfer device that transfers the toner image to a surface of a recording medium.

A transfer device according to the present exemplary embodiment comprises the image forming apparatus member according to the present exemplary embodiment and may comprise an intermediate transfer body that has a surface to which a toner image is to be transferred, a first transfer unit that performs first transfer of the toner image to the surface of the intermediate transfer body, and a second transfer unit that performs second transfer of the toner image transferred to the surface of the intermediate transfer body to a surface of a recording medium, and the second transfer unit may include a second transfer member comprising the image forming apparatus member according to the present exemplary embodiment.

An image forming apparatus according to the present exemplary embodiment may comprise an image carrier, a toner image forming device that forms a toner image on a surface of the image carrier, and the transfer device according to the present exemplary embodiment, which transfers the toner image to a surface of a recording medium.

As the transfer device, a transfer device (transfer device according to the present exemplary embodiment) is used which comprises the image forming apparatus member according to the present exemplary embodiment as a transfer member that comes into contact with a recording medium (an example of a transfer medium) to transfer a toner image (an example of a material to be transferred) to the recording medium.

A process cartridge according to the present exemplary embodiment may comprise a transfer device that is attachable to and detachable from, for example, an image forming apparatus configured as described above and that transfers a toner image to a surface of a recording medium. As the transfer device, the above transfer device according to the present exemplary embodiment is used.

The process cartridge according to the present exemplary embodiment may optionally include, for example, at least one selected from the group consisting of an image carrier, an electrostatic latent image forming device that forms an electrostatic latent image on a charged surface of the image carrier, a developing device that develops the latent image formed on the surface of the image carrier with a toner to form a toner image, a transfer device that transfers the toner image formed on the surface of the image carrier to a surface of a recording medium, and a cleaning device that cleans the surface of the image carrier.

Next, an image forming apparatus according to the present exemplary embodiment will be described with reference to the drawings.

Figure 3:
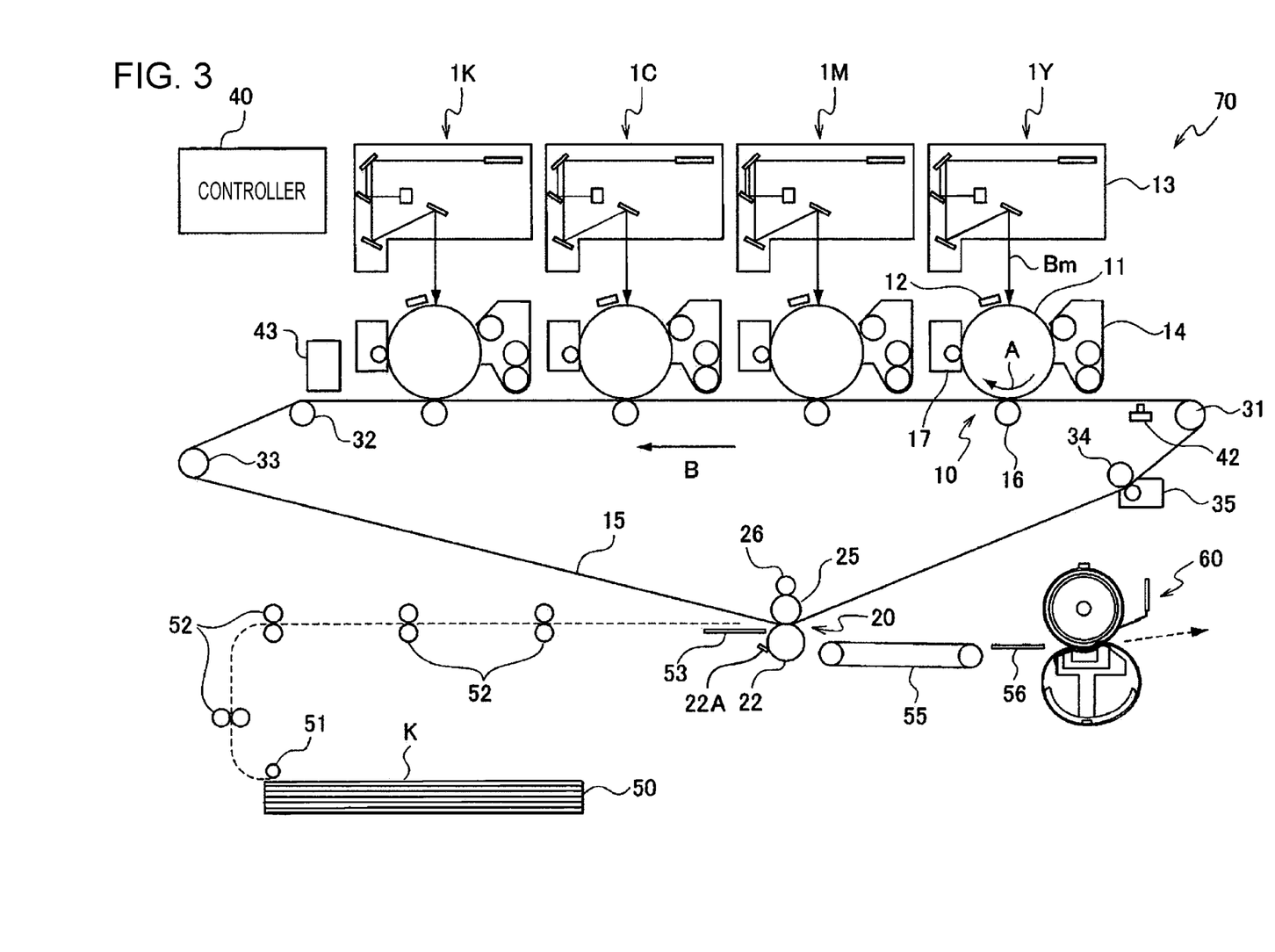
FIG. 3 is a schematic diagram illustrating an example image forming apparatus according to the present exemplary embodiment.

FIG. 3 is a schematic diagram illustrating the configuration of the image forming apparatus according to the present exemplary embodiment.

As illustrated in FIG. 3, for example, an image forming apparatus 70 according to the present exemplary embodiment is an intermediate-transfer image forming apparatus generally known as a tandem system and includes a plurality of image forming units 1Y, 1M, 1C, and 1K (an example of a toner image forming device) that form toner images of different colors by electrophotography, first transfer sections 10 that sequentially transfer (first transfer) the toner images of different colors formed by the image forming units 1Y, 1M, 1C, and 1K to an intermediate transfer belt 15, a second transfer section 20 that simultaneously transfers (second transfer) the superimposed toner image transferred to the intermediate transfer belt 15 to a sheet K serving as a recording medium, and a fixing device 60 that fixes the image subjected to the second transfer to the sheet K. The image forming apparatus 70 further includes a controller 40 that controls the operation of the individual devices (sections).

Each of the image forming units 1Y, 1M, 1C, and 1K of the image forming apparatus 70 includes a photoreceptor 11 that carries a toner image formed on a surface thereof and that rotates in the direction of the arrow A.

Disposed around the photoreceptor 11 are a charging device 12, serving as an example of a charging section, that charges the photoreceptor 11 and a laser exposure device 13, serving as a latent image forming section, that writes an electrostatic latent image on the photoreceptor 11 (in the figure, an exposure beam is denoted by the reference character Bm).

Also disposed around the photoreceptor 11 are a developing device 14, serving as an example of a developing section, that contains a toner of the corresponding color and that develops the electrostatic latent image on the photoreceptor 11 with the toner to form a visible image and a first transfer roller 16 that transfers the toner image of the corresponding color formed on the photoreceptor 11 to the intermediate transfer belt 15 in the first transfer section 10.

Also disposed around the photoreceptor 11 is a photoreceptor cleaner 17 that removes residual toner from the photoreceptor 11; thus, as electrophotographic devices, the charging device 12, the laser exposure device 13, the developing device 14, the first transfer roller 16, and the photoreceptor cleaner 17 are sequentially arranged in the rotational direction of the photoreceptor 11. The image forming units 1Y, 1M, 1C, and 1K are arranged substantially in a straight line in the following order from the upstream side of the intermediate transfer belt 15: yellow (Y), magenta (M), cyan (C), and black (K).

The intermediate transfer belt 15, serving as an example of an intermediate transfer body, is formed so as to have a volume resistivity of, for example, $1\times10^6$ Ωcm or more and $1\times10^{14}$ Ωcm or less and a thickness of, for example, about 0.1 mm.

The intermediate transfer belt 15 is driven to circulate (i.e., is rotated) by various rollers in the direction B illustrated in FIG. 3 at the speed depending on the purpose. The various rollers include a drive roller 31 that is driven by a motor (not illustrated) with good constant-speed properties to rotate the intermediate transfer belt 15, a support roller 32 that supports the intermediate transfer belt 15, which extends substantially in a straight line in the direction in which the photoreceptors 11 are arranged, a tension roller 33 that functions as a correction roller to apply tension to the intermediate transfer belt 15 and prevent the intermediate transfer belt 15 from meandering, a back roller 25 disposed in the second transfer section 20, and a cleaning back roller 34 disposed in a cleaning section that scrapes residual toner off the intermediate transfer belt 15.

Each of the first transfer sections 10 includes the first transfer roller 16, which is disposed opposite the photoreceptor 11 with the intermediate transfer belt 15 therebetween. The first transfer roller 16 is disposed in pressure contact with the photoreceptor 11 with the intermediate transfer belt 15 therebetween, and a voltage (first transfer bias) with a polarity opposite to the charge polarity (negative polarity; the same applies hereinafter) of the toner is applied to the first transfer roller 16. Thus, toner images on the photoreceptors 11 are sequentially electrostatically attracted to the intermediate transfer belt 15 to form a superimposed toner image on the intermediate transfer belt 15.

The second transfer section 20 includes the back roller 25 and a second transfer roller 22 disposed on the toner image carrying side of the intermediate transfer belt 15.

The back roller 25 is formed so as to have a surface resistivity of $1\times10^7$ Ω/sq or more and $1\times10^{10}$ Ω/sq or less and a hardness of, for example, 70° (Asker C, manufactured by Kobunshi Keiki Co., Ltd.; the same applies hereinafter). The back roller 25 is disposed on the back side of the intermediate transfer belt 15 and forms a counter electrode for the second transfer roller 22, and a power supply roller 26 made of a metal to which a second transfer bias is stably applied is disposed in contact with the back roller 25.

On the other hand, the second transfer roller 22 is a cylindrical roller having a volume resistivity of $10^{7.5}$ Ωcm or more and $10^{8.5}$ Ωcm or less. The second transfer roller 22 is disposed in pressure contact with the back roller 25 with the intermediate transfer belt 15 therebetween, and a second transfer bias is formed between the second transfer roller 22, which is grounded, and the back roller 25 to perform second transfer of a toner image to a sheet K transported to the second transfer section 20.

In addition, an intermediate transfer belt cleaning member 35 that removes residual toner and paper dust from the intermediate transfer belt 15 after the second transfer to clean the surface of the intermediate transfer belt 15 is disposed downstream of the second transfer section 20 so as to be movable into and out of contact with the intermediate transfer belt 15.

In addition, a second transfer roller cleaning member 22A that removes residual toner and paper dust from the second transfer roller 22 after the second transfer to clean the surface of the second transfer roller 22 is disposed on the second transfer roller 22 downstream of the second transfer section 20. An example of the second transfer roller cleaning member 22A is a cleaning blade. However, the second transfer roller cleaning member 22A may also be a cleaning roller.

The intermediate transfer belt 15, the first transfer rollers 16, and the second transfer roller 22 correspond to an example of a transfer device.

Figure 4:
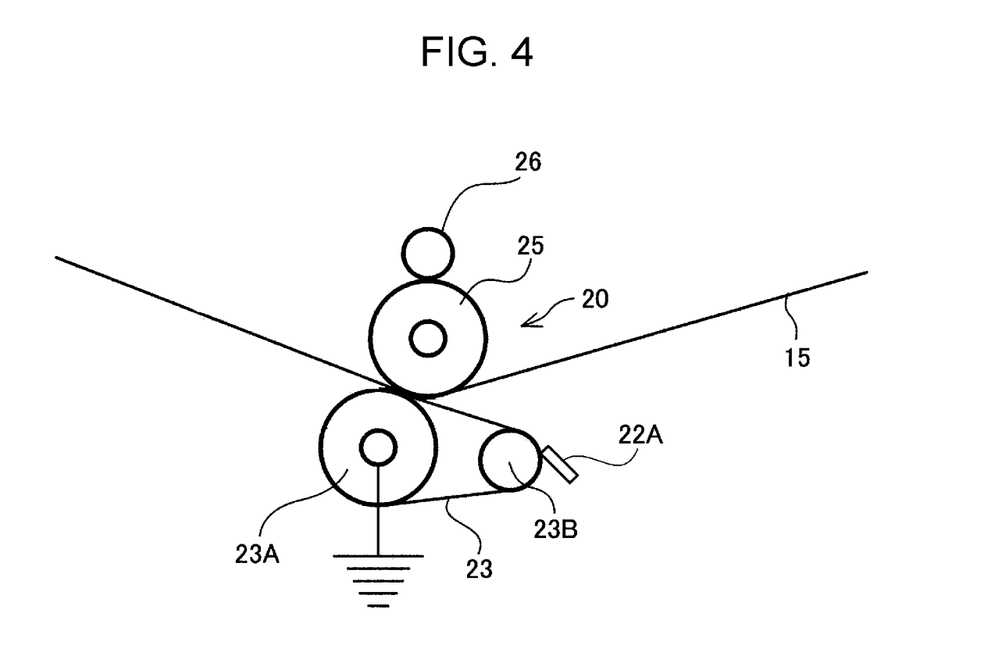
FIG. 4 is a schematic diagram illustrating a region surrounding a second transfer section of another example image forming apparatus according to the present exemplary embodiment.

Here, the image forming apparatus 70 may have a configuration including a second transfer belt (an example of a second transfer member) instead of the second transfer roller 22. Specifically, as illustrated in FIG. 4, the image forming apparatus 70 may include a second transfer unit including a second transfer belt 23, a drive roller 23A disposed opposite the back roller 25 with the intermediate transfer belt 15 and the second transfer belt 23 therebetween, and an idler roller 23B such that the second transfer belt 23 is stretched between the drive roller 23A and the idler roller 23B.

On the other hand, a reference sensor (home position sensor) 42 that generates a reference signal serving as a reference for setting the timing of image formation in the image forming units 1Y, 1M, 1C, and 1K is disposed upstream of the yellow image forming unit 1Y. In addition, an image density sensor 43 for image quality adjustment is disposed downstream of the black image forming unit 1K. The reference sensor 42 generates a reference signal upon sensing a mark provided on the back side of the intermediate transfer belt 15, and the image forming units 1Y, 1M, 1C, and 1K are configured to start image formation upon receiving an instruction from the controller 40 based on the sensed reference signal.

The image forming apparatus according to the present exemplary embodiment further includes, as a transport section that transports a sheet K, a sheet container 50 that contains a stack of sheets K, a sheet feed roller 51 that picks and transports a sheet K from the sheet container 50 at a predetermined timing, transport rollers 52 that transport the sheet K fed by the sheet feed roller 51, a transport guide 53 that guides the sheet K transported by the transport rollers 52 to the second transfer section 20, a transport belt 55 that transports the sheet K to the fixing device 60 after the second transfer by the second transfer roller 22, and a fixing entry guide 56 that guides the sheet K to the fixing device 60.

Next, the basic image forming process of the image forming apparatus according to the present exemplary embodiment will be described.

In the image forming apparatus according to the present exemplary embodiment, the image forming units 1Y, 1M, 1C, and 1K execute an image forming procedure after image data fed from, for example, an image reader (not illustrated) or a personal computer (PC) (not illustrated) is subjected to image processing by an image processor (not shown).

The image processor performs image processing on input reflectance data, including shading correction, misalignment correction, lightness/color space conversion, gamma correction, frame deletion, and various types of image editing such as color editing and moving editing. The image data subjected to the image processing is converted into colorant gradation data of four colors, namely, Y, M, C, and K, and the colorant gradation data is fed to the laser exposure devices 13.

Based on the input colorant gradation data, the photoreceptors 11 of the image forming units 1Y, 1M, 1C, and 1K are irradiated with the exposure beams Bm emitted from, for example, semiconductor lasers by the laser exposure devices 13. The surfaces of the photoreceptors 11 of the image forming units 1Y, 1M, 1C, and 1K are charged by the charging devices 12 and are then scanned with the exposure beams Bm by the laser exposure devices 13 to form electrostatic latent images. The thus-formed electrostatic latent images are developed into Y, M, C, and K toner images by the image forming units 1Y, 1M, 1C, and 1K, respectively.

The toner images formed on the photoreceptors 11 of the image forming units 1Y, 1M, 1C, and 1K are transferred to the intermediate transfer belt 15 in the first transfer sections 10, where the photoreceptors 11 are in contact with the intermediate transfer belt 15. More specifically, in the first transfer sections 10, a voltage (first transfer bias) with a polarity opposite to the charge polarity (negative polarity) of the toner is applied to the substrate of the intermediate transfer belt 15 through the first transfer rollers 16 to perform first transfer such that the toner images are sequentially superimposed on top of each other on the surface of the intermediate transfer belt 15.

After the toner images are sequentially subjected to the first transfer to the surface of the intermediate transfer belt 15, the intermediate transfer belt 15 is moved to transport the superimposed toner image to the second transfer section 20. When the toner image is transported to the second transfer section 20, the sheet feed roller 51 in the transport section is rotated in synchronization with the timing when the toner image is transported to the second transfer section 20 to feed a sheet K of intended size from the sheet container 50. The sheet K fed by the sheet feed roller 51 is transported to the transport rollers 52 and is then transported via the transport guide 53 to reach the second transfer section 20. Before reaching the second transfer section 20, the sheet K is temporality stopped, and a registration roller (not illustrated) is rotated in synchronization with the timing when the intermediate transfer belt 15 having the toner image carried thereon is moved such that the position of the sheet K is aligned with the position of the toner image.

In the second transfer section 20, the second transfer roller 22 is pressed against the back roller 25 with the intermediate transfer belt 15 therebetween. The sheet K is transported at an appropriate timing into the nip between the intermediate transfer belt 15 and the second transfer roller 22. When a voltage (second transfer bias) with a polarity opposite to the charge polarity (negative polarity) of the toner is applied through the power supply roller 26, a transfer electric field is formed between the second transfer roller 22 and the back roller 25. The unfixed toner image carried on the intermediate transfer belt 15 is simultaneously electrostatically transferred to the sheet K in the second transfer section 20 in which the second transfer roller 22 is pressed against the back roller 25.

Thereafter, the sheet K having the toner image electrostatically transferred thereto is transported by the second transfer roller 22 to the transport belt 55 disposed downstream of the second transfer roller 22 in the sheet transport direction while being released from the intermediate transfer belt 15. The transport belt 55 transports the sheet K to the fixing device 60 at the transport speed optimized for the fixing device 60. The unfixed toner image on the sheet K transported to the fixing device 60 is subjected to fixing treatment with heat and pressure by the fixing device 60 and is thereby fixed to the sheet K. The sheet K having the fixed image formed thereon is transported to an output container (not illustrated) disposed in the output section of the image forming apparatus.

On the other hand, upon completion of transfer to the sheet K, residual toner on the intermediate transfer belt 15 is transported to the cleaning section by the rotation of the intermediate transfer belt 15 and is removed from the intermediate transfer belt 15 by the cleaning back roller 34 and the intermediate transfer belt cleaner 35.

The toners and developers used in the image forming apparatus according to the present exemplary embodiment are not particularly limited, and any known electrophotographic toner or developer can be used.

The recording media used in the image forming apparatus according to the present exemplary embodiment are not particularly limited, and examples of recording media include sheets of paper for use in electrophotographic copiers and printers; and OHP sheets.

EXAMPLES

The present disclosure will now be more specifically described with reference to the following examples. These examples, however, are not intended to limit the present disclosure. In the following description, parts and percentages are by mass unless otherwise specified.

Example 1

Formation of Elastic Layer

Formation of Elastic Foam

EP70 (urethane foam manufactured by Inoac Corporation) is used as an elastic foam and is cut into a cylindrical shape with an outer diameter of 26 mm and an inner diameter of 14 mm to obtain a cylindrical elastic foam.

The resulting elastic foam has an open-cell structure with a cell size of 400 μm and a density of 70 kg/m$^3$.

Formation of Conductive Covering Layer

A treatment liquid is prepared by mixing an aqueous dispersion containing 36% by mass of carbon black dispersed therein with an acrylic emulsion (the trade name "Nipol LX852", manufactured by Zeon Corporation) in a mass ratio of 1:1, and the elastic foam obtained in the above manner is immersed therein at 20° C. for 10 minutes.

The elastic foam having the treatment liquid deposited thereon is then dried by heating in a cure oven set to 100° C. for 60 minutes to remove moisture and crosslink the acrylic resin. The acrylic resin is crosslinked and cured to form a conductive covering layer containing carbon black on the exposed surface of the elastic foam.

Thus, an elastic layer including an elastic foam and a conductive covering layer covering the exposed surface of the elastic foam is obtained.

A conductive support member (made of stainless steel and having a diameter of 14 mm) having the surface thereof coated with an adhesive is then inserted into the resulting elastic layer to form a roller member.

Formation of Intermediate Layer

A coating liquid for forming an intermediate layer is prepared by mixing together 70 parts of a urethane oligomer (urethane acrylate UV3700B, manufactured by Nippon Synthetic Chemical Industry Co., Ltd.), 30 parts of a urethane monomer (isomyristyl acrylate, manufactured by Kyoeisha Chemical Co., Ltd.), 0.5 parts of a polymerization initiator (1-hydroxycyclohexyl phenyl ketone, Irgacure 184, manufactured by Ciba Specialty Chemicals Corporation), and 3 parts of alkyltrimethylammonium perchlorate (the trade name "LXN-30", manufactured by Daiso Co., Ltd.). The resulting coating liquid for forming an intermediate layer is applied to the elastic layer using a die coater, and the coating is irradiated with ultraviolet (UV) light at a UV irradiation intensity of 700 mW/cm$^2$ for 5 seconds while being rotated. By this procedure, an intermediate layer with a thickness of 1 mm is formed.

Formation of Surface Layer

Subsequently, a silicone-modified polynorbornene material (NBN-30-ID, manufactured by Shin-Etsu Chemical Co., Ltd., isododecane solution of (norbornene/tris(trimethylsiloxy)silylnorbornene) copolymer, N1/N2=60/40 (mol/mol), Mn=360,000, effective concentration: 30% by mass) coating liquid is applied to the intermediate layer by spray coating and is dried and cured to form a surface layer with a thickness of 30 μm.

Thus, a conductive roller (image forming apparatus member) having a volume resistance value of $10^{6.8}\Omega$ (as measured at an applied voltage of 1,000 V) is obtained.

Evaluation Methods

A 1 mm thick sheet specimen including the surface layer is cut from the roller, and its friction coefficient for a urethane block is measured using a Heidon friction coefficient meter. A specimen with a friction coefficient of less than 0.15 is rated as A, a specimen with a friction coefficient of 0.15 or more and less than 0.3 is rated as B, and a specimen with a friction coefficient of 0.3 or more is rated as C.

A 100% black (K) solid image is printed on one side of A3 plain paper using an ApeosPort VII C6688 manufactured by FUJIFILM Business Innovation Corp. After printing on 10,000 sheets of paper, the 10,001 st printed sheet of paper is visually inspected for soiling on the back side. A sheet with a soiled area of 10% or more on the back side is rated as G3, a sheet with a soiled area of less than 10% and 5% or more on the back side is rated as G2, a sheet with a soiled area of less than 5% and more than 0% on the back side is rated as G1, and a sheet with no soiling on the back side is rated as G0.

In addition, the surface layer after printing is examined under a microscope for the presence or absence of cracks. A surface layer with 40 or more cracks in a 1 mm square area is rated as G3, a surface layer with less than 40 and 10 or more cracks in a 1 mm square area is rated as G2, a surface layer with less than 10 and 1 or more cracks in a 1 mm square area is rated as G1, and a surface layer with no cracks in a 1 mm square area is rated as G0.

Example 2

A roller is obtained as in Example 1 except that the silicone-modified polynorbornene material (A) in Example 1 is mixed with an isododecane solution (effective concentration: 30% by mass) (B) of a cycloolefin polymer (COP, ZEONOR, manufactured by Zeon Corporation) in a ratio of A:B=2:1, and the mixture is applied. In addition, the roller is evaluated as in Example 1.

Example 3

A polyamide resin (nylon 12) and carbon black (oil absorption value: 190 ml/100 g) are mixed and pelletized in a twin-screw mixer such that the mixing ratio (by weight) of the polyamide resin to the electronic conductor is 90:10 to obtain a composition for forming a substrate layer.

A thermoplastic ester-based polyurethane and an ethylene oxide-propylene oxide copolymer are mixed and pelletized in a kneader such that the mixing ratio (by weight) of the thermoplastic elastomer to the ionic conductor is 99:1 to obtain a composition for forming an elastic layer.

A system including two extruders with a cylinder diameter of 50 mm and a two-layer annular die attached to the ends of the extruders is used to coextrude the composition for forming a substrate layer and the composition for forming an elastic layer into a tubular shape, and the tube is then cut to a length of 400 mm to obtain a belt including a substrate layer with a thickness of 150 μm as an inner layer and an elastic layer with a thickness of 150 μm and having a circumference of 125 mm and a width of 400 mm.

A surface layer is formed on the resulting transfer belt as in Example 1 to form a belt.

The thus-formed belt is evaluated as in Example 1 except that the belt is attached as a second transfer belt to an Iridesse Production Press manufactured by FUJIFILM Business Innovation Corp. and is evaluated for image quality.

Comparative Example 1

A roller is obtained as in Example 1 except that the surface layer material used in Example 1 is replaced with a silicone resin having hydroxyl groups (X-40-2406M, manufactured by Shin-Etsu Chemical Co., Ltd.). In addition, the roller is evaluated as in Example 1.

Comparative Example 2

A roller is obtained as in Example 1 except that the surface layer material used in Example 1 is replaced with T862A (Si-atom-free, fluorine-atom containing urethane resin, manufactured by Henkel Japan Ltd.). In addition, the roller is evaluated as in Example 1.

Comparative Example 3

A roller is obtained as in Example 1 except that an isododecane solution (effective concentration: 30% by mass) of a cycloolefin polymer (COP, ZEONOR, manufactured by Zeon Corporation) is applied as the surface layer material in Example 1. In addition, the roller is evaluated as in Example 1.

TABLE 1

| | Form | Surface layer material | Surface free energy of surface layer | | | Presence or absence of Hydrogen fluorine atoms in surface layer | Friction coefficient | Friction coefficient rating | Soiling resistance retaining properties | |
| | | | Dispersive component (mN/m) | Dipole component (mN/m) | Hydrogen bonding component (mN/m) | | | | Soiling on back side of printed sheet | Cracks in surface layer after printing |
|---|---|---|---|---|---|---|---|---|---|---|
| Ex. 1 | Roller | NBN-30-ID | 23 | 1 | 1 | Contain no fluorine atoms | 0.10 | A | G0 | G0 |
| Ex. 2 | Roller | NBN-30-ID:COP = 2:1 | 24 | 4 | 4 | Contain no fluorine atoms | 0.14 | A | G1 | G0 |
| Ex. 3 | Belt | NBN-30-ID | 23 | 1 | 1 | Contain no fluorine atoms | 0.10 | A | G0 | G0 |
| Com. Ex. 1 | Roller | X-40-2406M | 25 | 3 | 8 | Contain no fluorine atoms | 0.40 | C | G3 | G2 |
| Com. Ex. 2 | Roller | T862A | 22 | 1 | 0 | Contain fluorine atoms | 0.10 | A | G2 | G3 |
| Com. Ex. 3 | Roller | COP | 35 | 10 | 3 | Contain no fluorine atoms | 0.20 | B | G3 | G1 |

As shown in Table 1, it is found that the image forming apparatus members of the Examples may exhibit better soiling resistance retaining properties than the image forming apparatus members of the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An image forming apparatus member comprising:
a surface layer containing a Si-atom containing polymer as a major component,
wherein a dispersive component of a surface free energy of the surface layer is 25 mN/m or less, a dipole component of the surface free energy of the surface layer is 5 mN/m or less, and a hydrogen bonding component of the surface free energy of the surface layer is 5 mN/m or less.

(((2))) The image forming apparatus member according to (((1))), wherein a main chain backbone of the Si-atom containing polymer is a polynorbornene backbone.

(((3))) The image forming apparatus member according to (((1))) or (((2))), wherein the Si-atom containing polymer has a trialkylsiloxy group.

(((4))) The image forming apparatus member according to (((3))), wherein the trialkylsiloxy group is a trimethylsiloxy group.

(((5))) The image forming apparatus member according to any one of (((1))) to (((4))), wherein the Si-atom containing polymer has a tris(trialkylsiloxy)silyl group.

(((6))) The image forming apparatus member according to any one of (((1))) to (((5))), wherein the Si-atom containing polymer is a silicone-modified polynorbornene resin having a structural unit represented by the following structure (N1) and a structural unit represented by the following structure (N2):

where $R^1$, $R^2$, and $R^3$ in the structure (N1) each independently represent an alkyl group.

(((7))) The image forming apparatus member according to (((6))), wherein a copolymerization ratio (N1/N2) by mole of the structural unit represented by the structure (N1) to the structural unit represented by the structure (N2) is 30/70 or more and 95/5 or less.

(((8))) The image forming apparatus member according to (((7))), wherein the copolymerization ratio (N1/N2) is 40/60 or more and 85/15 or less.

(((9))) The image forming apparatus member according to any one of (((1))) to (((8))), wherein a proportion of Si atoms present in a surface of the surface layer as measured by X-ray photoelectron spectroscopy is 10 atom % or more and 50 atom % or less.

(((10))) The image forming apparatus member according to (((9))), wherein the proportion of the Si atoms is 20 atom % or more and 45 atom % or less.

(((11))) The image forming apparatus member according to any one of (((1))) to (((10))), wherein the image forming apparatus member is a belt member or a roller member.

(((12))) The image forming apparatus member according to any one of (((1))) to (((11))), wherein:
a main chain backbone of the Si-atom containing polymer is a polynorbornene backbone; and
the Si-atom containing polymer has a trialkylsiloxy group.

(((13))) The image forming apparatus member according to (((12))), wherein the trialkylsiloxy group is a trimethylsiloxy group.

(((14))) The image forming apparatus member according to (((12))) or (((13))), wherein a proportion of Si atoms present in a surface of the surface layer as measured by X-ray photoelectron spectroscopy is 10 atom % or more and 50 atom % or less.

(((15))) A transfer device comprising: an intermediate transfer body that has a surface to which a toner image is to be transferred;
a first transfer unit that performs first transfer of the toner image to the surface of the intermediate transfer body; and
a second transfer unit that performs second transfer of the toner image transferred to the surface of the intermediate transfer body to a surface of a recording medium, the second transfer unit including a second transfer member comprising the image forming apparatus member according to any one of (((1))) to (((14))).

(((16))) An image forming apparatus comprising:
a toner image forming device that includes a photoreceptor and that forms a toner image on a surface of the photoreceptor; and
the transfer device according to (((15))), wherein the transfer device transfers the toner image to a surface of a recording medium.

What is claimed is:
1. An image forming apparatus member comprising:
a surface layer containing a Si-atom containing polymer as a major component,
wherein a dispersive component of a surface free energy of the surface layer is 25 mN/m or less, a dipole component of the surface free energy of the surface layer is 5 mN/m or less, and a hydrogen bonding component of the surface free energy of the surface layer is 5 mN/m or less, and
wherein a main chain backbone of the Si-atom containing polymer is a backbone having a cyclic hydrocarbon structure.
2. The image forming apparatus member according to claim 1, wherein the main chain backbone of the Si-atom containing polymer is a polynorbornene backbone.
3. The image forming apparatus member according to claim 1, wherein the Si-atom containing polymer has a tris(trialkylsiloxy)silyl group.
4. The image forming apparatus member according to claim 1, wherein the Si-atom containing polymer is a silicone-modified polynorbornene resin having a structural unit represented by the following structure (N1) and a structural unit represented by the following structure (N2):

(N1)

(N2)

where R1, R2, and R3 in the structure (N1) each independently represent an alkyl group.

5. The image forming apparatus member according to claim 4, wherein a copolymerization ratio (N1/N2) by mole of the structural unit represented by the structure (N1) to the structural unit represented by the structure (N2) is 30/70 or more and 95/5 or less.

6. The image forming apparatus member according to claim 5, wherein the copolymerization ratio (N1/N2) is 40/60 or more and 85/15 or less.

7. The image forming apparatus member according to claim 1, wherein the image forming apparatus member is a belt member or a roller member.

8. The image forming apparatus member according to claim 1, wherein:
a main chain backbone of the Si-atom containing polymer is a polynorbornene backbone; and
the Si-atom containing polymer has a trialkylsiloxy group.

9. The image forming apparatus member according to claim 8, wherein the trialkylsiloxy group is a trimethylsiloxy group.

10. The image forming apparatus member according to claim 8, wherein a proportion of Si atoms present in a surface of the surface layer as measured by X-ray photoelectron spectroscopy is 10 atom % or more and 50 atom % or less.

11. A transfer device comprising:
an intermediate transfer body that has a surface to which a toner image is to be transferred;
a first transfer unit that performs first transfer of the toner image to the surface of the intermediate transfer body; and
a second transfer unit that performs second transfer of the toner image transferred to the surface of the intermediate transfer body to a surface of a recording medium, the second transfer unit including a second transfer member comprising the image forming apparatus member according to claim 1.

12. An image forming apparatus comprising:
a toner image forming device that includes a photoreceptor and that forms a toner image on a surface of the photoreceptor; and
the transfer device according to claim 11, wherein the transfer device transfers the toner image to a surface of a recording medium.

13. An image forming apparatus member comprising:
a surface layer containing a Si-atom containing polymer as a major component,
wherein a dispersive component of a surface free energy of the surface layer is 25 mN/m or less, a dipole component of the surface free energy of the surface layer is 5 mN/m or less, and a hydrogen bonding component of the surface free energy of the surface layer is 5 mN/m or less, and
wherein the Si-atom containing polymer has a trialkylsiloxy group.

14. The image forming apparatus member according to claim 13, wherein the trialkylsiloxy group is a trimethylsiloxy group.

15. A transfer device comprising:
an intermediate transfer body that has a surface to which a toner image is to be transferred;
a first transfer unit that performs first transfer of the toner image to the surface of the intermediate transfer body; and
a second transfer unit that performs second transfer of the toner image transferred to the surface of the intermediate transfer body to a surface of a recording medium, the second transfer unit including a second transfer member comprising the image forming apparatus member according to claim 3.

16. An image forming apparatus comprising:
a toner image forming device that includes a photoreceptor and that forms a toner image on a surface of the photoreceptor; and
the transfer device according to claim 15, wherein the transfer device transfers the toner image to a surface of a recording medium.

17. An image forming apparatus member comprising:
a surface layer containing a Si-atom containing polymer as a major component,
wherein a dispersive component of a surface free energy of the surface layer is 25 mN/m or less, a dipole component of the surface free energy of the surface layer is 5 mN/m or less, and a hydrogen bonding component of the surface free energy of the surface layer is 5 mN/m or less, and
wherein a proportion of Si atoms present in a surface of the surface layer as measured by X-ray photoelectron spectroscopy is 10 atom % or more and 50 atom % or less.

18. The image forming apparatus member according to claim 17, wherein the proportion of the Si atoms is 20 atom % or more and 45 atom % or less.

19. A transfer device comprising:
an intermediate transfer body that has a surface to which a toner image is to be transferred;
a first transfer unit that performs first transfer of the toner image to the surface of the intermediate transfer body; and
a second transfer unit that performs second transfer of the toner image transferred to the surface of the intermediate transfer body to a surface of a recording medium, the second transfer unit including a second transfer member comprising the image forming apparatus member according to claim 9.

20. An image forming apparatus comprising:
a toner image forming device that includes a photoreceptor and that forms a toner image on a surface of the photoreceptor; and the transfer device according to claim 19, wherein the transfer device transfers the toner image to a surface of a recording medium.

\* \* \* \* \*